S. COZEL, A. KOWALCZYK & W. NAYDA.
DIRECTION INDICATOR.
APPLICATION FILED MAR. 2, 1917.
1,264,162. Patented Apr. 30, 1918.
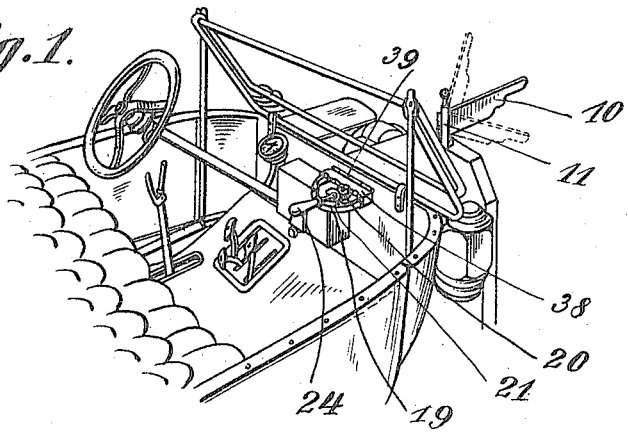
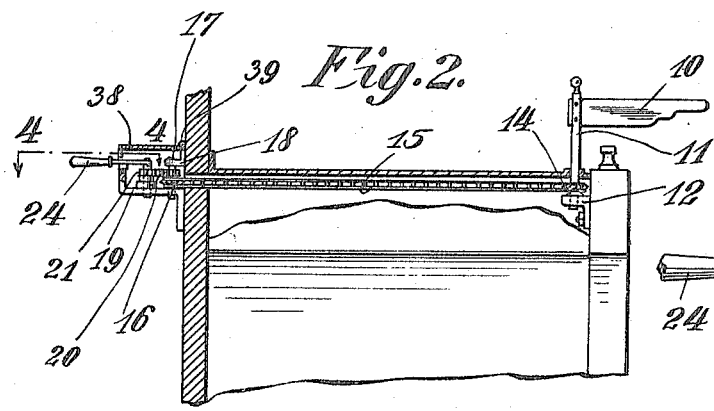
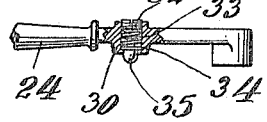
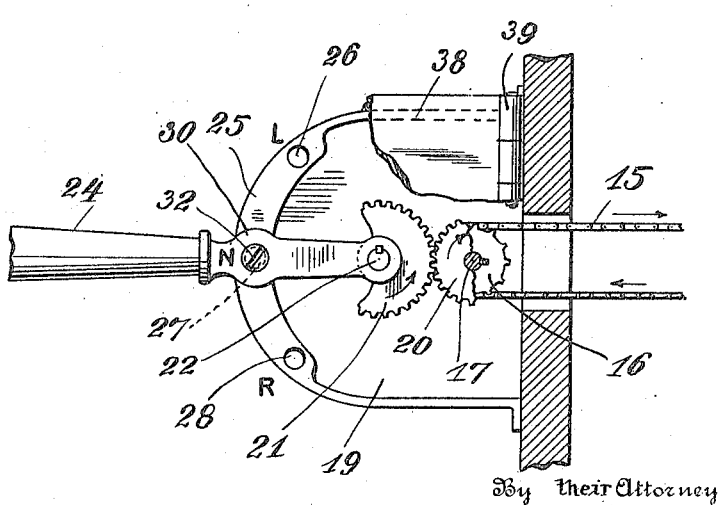
Inventors
Stanislaw Cozel
Antoni Kowalczyk
Wladyslaw Nayda
By their Attorney
Oscar Gill

UNITED STATES PATENT OFFICE.

STANISLAW COZEL, ANTONI KOWALCZYK, AND WLADYSLAW NAYDA, OF WILMINGTON, DELAWARE.

DIRECTION-INDICATOR.

1,264,162.          Specification of Letters Patent.      Patented Apr. 30, 1918.

Application filed March 2, 1917. Serial No. 151,903.

*To all whom it may concern:*

Be it known that I, STANISLAW COZEL, a subject of the Czar of Russia, resident of Wilmington, county of New Castle, and State of Delaware, and I, ANTONI KOWALCZYK, a subject of the Czar of Russia, resident of Wilmington, county of New Castle, and State of Delaware, and I, WLADYSLAW NAYDA, a subject of the Czar of Russia, resident of Wilmington, county of New Castle, and State of Delaware, have invented certain new and useful Improvements in Direction-Indicators, of which the following is a specification.

This invention relates to improvements in vehicle signaling devices, whereby the proposed turning direction of a vehicle may be seen by an adjacent party, the operating devices being readily accessible to the party in control of the car who is thus able to clearly designate to other vehicles alongside or at the rear his intentions to turn and in which direction the turn is to be made.

This object is attained by the novel design, construction and combination of parts hereafter described and shown in the accompanying drawings, forming a material part of this specification, and in which:—

Figure 1 is a perspective view of the front part of the car indicating the control means.

Fig. 2 is a partial vertical sectional view taken through the center of the car at the front thereof.

Fig. 3 is an enlarged fragmental plan view of the operating means, parts being broken away to disclose the interior, the view being taken on line 4—4 of Fig. 3, and Fig. 4 is a partial side elevational and sectional view showing the containing means for the control lever.

The invention consists of a hand or index 10 rigidly attached to a stem or mast 11 supported in a bracket 12 carried centrally at the front of the machine, preferably below the engine casing cover so as to be concealed.

Secured to the stem 11 is a sprocket 14 with which is engaged a chain 15 extending rearwardly under the casing and through the dash to a point substantially in front of the operator where the chain is engaged with a similar sprocket 16 mounted upon a shaft 17 the same being rotatably carried in a vertical position by the brackets 18 and 19, the latter forming the lower part of a casing in which the operative mechanism is contained.

Also engaged to the shaft 17 is a spur pinion 20 engaging with a segmental gear 21 secured to a shaft 22 likewise mounted on the bracket 19 and upon which the lever or operating handle 24 is pivoted.

The outer edge 25 of the bracket 19 is formed arcuately and in the thickened edge are openings 26, 27 and 28, respectively, by means of which the action of the lever is controlled as to indicate the position of the index stem.

Formed in the hub-like extension 30 of the lever 24 is a screw-thread having an opening therebelow containing a spring 33, the lower end of the opening receiving the flange 34 from which extends the pin 35 which may be engaged in any of the openings 26, 27 and 28 indicating that the vehicle is to be turned toward the right, or left, or if the pin is in the central opening 27 the index will extend straight forward in a neutral position.

A cover 38 is attached at the rear by the hinges 39 permitting access to the mechanism when desired and otherwise excluding miscellaneous articles as dirt and the like and affording a finish for the casing.

In operation, the parts having been attached to the front of the car in the manner indicated, when the driver desires to turn the vehicle toward the right, the handle 24 is turned in that direction and by reason of the gears, the index or hand 10 will also be turned toward the right, the same being plainly visible to parties in the neighborhood.

We claim:—

The combination with a vehicle, of a U-shaped bracket secured at its ends to the dash of the vehicle, a bottom plate for the bracket, a pin carried by the plate and extending vertically therefrom, a lever fulcrumed on the pin, a segment formed upon the lever, a gear operated by the segment, a signal mounted upon the vehicle, an operative connection between the gear and signal, the arch of the bracket being enlarged and having recesses therein, and a spring member carried by the lever for engaging the recesses and locking the lever in adjusted positions.

In testimony whereof we have affixed our signatures this 10th day of February, 1917.

STANISLAW COZEL.
ANTONI KOWALCZYK.
WLADYSLAW NAYDA.